United States Patent
Faraone et al.

(10) Patent No.: US 9,144,028 B2
(45) Date of Patent: Sep. 22, 2015

(54) METHOD AND APPARATUS FOR UPLINK POWER CONTROL IN A WIRELESS COMMUNICATION SYSTEM

(71) Applicant: Motorola Solutions, Inc., Schaumburg, IL (US)

(72) Inventors: Antonio Faraone, Fort Lauderdale, FL (US); Giorgi G. Bit-Babik, Sunrise, FL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 179 days.

(21) Appl. No.: 13/731,646

(22) Filed: Dec. 31, 2012

(65) Prior Publication Data

US 2014/0187281 A1    Jul. 3, 2014

(51) Int. Cl.
*H04W 52/14*    (2009.01)
*H04W 52/28*    (2009.01)
*H04W 52/36*    (2009.01)

(52) U.S. Cl.
CPC .......... *H04W 52/146* (2013.01); *H04W 52/288* (2013.01); *H04W 52/367* (2013.01)

(58) Field of Classification Search
CPC ... H04W 52/367; H04B 1/3838; H04B 7/022; H04B 7/0413; H04B 7/0617; H04B 7/0691; H04B 7/0874; H04B 7/10
USPC .......................................... 455/522; 370/318
See application file for complete search history.

(56) References Cited

U.S. PATENT DOCUMENTS

| | | | |
|---|---|---|---|
| 5,369,728 A | 11/1994 | Kosaka et al. | |
| 5,425,129 A | 6/1995 | Garman et al. | |
| 5,752,231 A | 5/1998 | Gammel et al. | |
| 6,009,383 A | 12/1999 | Mony | |
| 7,035,091 B2 | 4/2006 | Le et al. | |
| 7,146,139 B2 | 12/2006 | Nevermann | |
| 7,221,290 B2 | 5/2007 | Burgemeister | |
| 7,499,722 B2 | 3/2009 | McDowell et al. | |
| 7,664,649 B2 | 2/2010 | Jost et al. | |

(Continued)

FOREIGN PATENT DOCUMENTS

| | | | |
|---|---|---|---|
| WO | 0205443 A2 | 1/2002 | |
| WO | 03038659 A1 | 5/2003 | |

(Continued)

OTHER PUBLICATIONS

Xbox, Kinect Voice Commands and Speech Regognition; Sep. 8, 2011; xbox.com; 3 Pages.

(Continued)

*Primary Examiner* — Bobbak Safaipour
(74) *Attorney, Agent, or Firm* — Steven A. May

(57) ABSTRACT

A method, mobile station, and user-based communication system are provided that determine that a mobile station intends to transmit over an uplink, determine whether the mobile station is being operated in a body-worn position, determine an uplink transmit power scale factor, and when the mobile station is being operated in a body-worn position, apply the uplink transmit power scale factor to an uplink transmit power to produce a scaled uplink transmit power. In one embodiment, the user-based communication system includes the mobile station and an audio accessory and determines whether the mobile station is being operated in a body-worn position based on a determination of whether the audio accessory is actively engaged.

15 Claims, 6 Drawing Sheets

(56) References Cited

U.S. PATENT DOCUMENTS

| | | |
|---|---|---|
| 8,023,984 B2 | 9/2011 | Jin et al. |
| 8,103,510 B2 | 1/2012 | Sato |
| 8,811,918 B2 * | 8/2014 | Rath et al. ............... 455/117 |
| 2007/0005370 A1 | 1/2007 | Elshout |
| 2007/0177744 A1 | 8/2007 | Kirn |
| 2008/0062045 A1 * | 3/2008 | Dinallo et al. ......... 343/700 MS |
| 2008/0242288 A1 | 10/2008 | Guyette |
| 2009/0305742 A1 | 12/2009 | Caballero et al. |
| 2009/0313014 A1 | 12/2009 | Shin |
| 2010/0114573 A1 | 5/2010 | Huang et al. |
| 2011/0237289 A1 * | 9/2011 | Fodor et al. ............... 455/522 |
| 2012/0010890 A1 | 1/2012 | Koverzin |
| 2012/0071195 A1 | 3/2012 | Chakraborty et al. |
| 2012/0257657 A1 | 10/2012 | Subrahmanya et al. |
| 2014/0257812 A1 * | 9/2014 | Mozer ........................ 704/246 |

FOREIGN PATENT DOCUMENTS

| | | |
|---|---|---|
| WO | 2012033825 A1 | 3/2012 |
| WO | 2012066559 A1 | 5/2012 |
| WO | 2012122116 A1 | 9/2012 |
| WO | 2013011352 A1 | 1/2013 |
| WO | 20130048876 A1 | 4/2013 |

OTHER PUBLICATIONS

Corresponding International Application No. PCT/US2013/071972—International Search Report Dated Feb. 11, 2014.

PCT International Search Report Dated Dec. 3, 2013 for Related Application (PCT/US2013/065221).

* cited by examiner

METHOD AND APPARATUS FOR UPLINK POWER CONTROL IN A WIRELESS COMMUNICATION SYSTEM

FIELD OF THE INVENTION

The present invention relates generally to wireless communication systems, and, in particular, to uplink power control in a wireless communication system.

BACKGROUND OF THE INVENTION

Regulatory agencies in most countries have mandated that two-way radios (also called "walkie-talkies") be tested for Specific Absorption Rate (SAR) compliance. Two-way radios operate in simplex communication systems where the radio transmit and receive phases are interleaved in time, whereby radio transmission from the mobile station is typically triggered through the use of a Push-to-Talk (PTT) function and reception is enabled in between transmit phases. The PTT function can be typically triggered by the user pressing a PTT button located on the radio itself, which is typically done when the radio is operated in front of the face, or by pressing a PTT button residing on an audio accessory, such as a chest-worn radio-speaker microphone (RSM) wired to a belt-worn radio.

Accordingly, the International Electrotechnical Commission (IEC) 62209-2 (2010) SAR testing standard and currently applicable FCC regulations prescribe that SAR tests be conducted in two use-configurations, that is, with the radio in a talk-position "at the face" of a user, and more particularly with the radio placed 2.5 centimeters (cm) from a flat phantom representing the user head, and with the radio in a "body-worn" position placed next to a flat phantom representing the user body, wherein the radio is typically hosted in a carry accessory, for instance a belt-worn leather pouch, and operated by means of a RSM. In current standards and regulations, two exposure tiers are defined for consumer and professional radios, respectively, the latter allowing a larger SAR limit under the stipulation that professional users are aware of and trained on how to control radio frequency (RF) energy exposure (this is why this exposure tier was called "controlled" in past standards). Further, for discontinuous transmission such as PTT operation, SAR is averaged over 6 minutes under the occupational exposure tier. For simplex PTT radios, said time-averaging is implemented by allowing the assumption of 50% transmission duty-cycle (also called "talk-time"). For instance, the Federal Communications Commission (FCC) has adopted a 1.6 watt/kilogram (kg) SAR limits for the general public, applicable to consumer radios, and a 8.0 watt/kg SAR limit for occupational users, applicable to professional radios, therefore the measured SAR for a professional radio needs to be halved (50% talk-time) before comparing it with the 8.0 watt/kg limit.

Unlike cellular phones, which transmit at variable uplink transmit power depending on noise, fading, distance as demanded in real-time by the infrastructure networks they operate in, two-way radios are typically designed to be used in peer-to-peer (for example, radio-to-radio) and trunked (infrastructure-based) modes without real-time power adjustments. Therefore, to maximize communications reliability which are of the essence particularly in mission-critical (public-safety) applications, two-way radios are typically set to transmit at a set power level (typically corresponding to the maximum nominal rated power) whenever the PTT function is triggered. The IEC 62209-2 (2010) standard recommends that body-worn SAR measurements be conducted at the maximum power enabled in each manufacturer-defined intended use condition, which in the case of public safety two-way radios may include the use of carry accessories (for example, carry cases, belt clips) during SAR tests for radios that may be operated at the belt (body-worn position), and require the use of an audio accessory, such as a RSM or a PTT-capable Bluetooth radio, for the user to talk into upon triggering the PTT function.

Because carry accessories may provide smaller than 2.5 cm separation distances from the body and their metal content may support currents excited by the radio that may alter the resulting SAR level and distribution, it has been often observed that SAR levels may be higher in "body-worn" rather than in "at the face" use-configurations. Therefore, developing a two-way radio product to comply with SAR limits for the body-worn use frequently involves significant design efforts. Indeed, for given radio, antenna, audio and carry accessories designs, SAR is linearly dependent on the uplink transmit power averaged over a specified time-window, for instance 6 minutes.

Because standards are frequently revised and updated regulations promulgated, it is important to devise methods that ensure achievable SAR compliance of two-way radios even under shifting regulatory framework scenarios, especially considering that professional radio products can be available in the global marketplace for decades. Regulatory changes seldom occur in a synchronized and harmonized fashion across world regions and countries, rather they typically are implemented by national and regional regulators according to their own specific needs and timelines. Therefore, particular RF energy exposure restrictions are frequently encountered in applicable regulations in different countries or regions. Therefore, it is desirable to devise methods to ensure RF energy exposure compliance even under markedly non-uniform application of particular RF energy exposure requirements across countries and regions.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for methods to ensure RF energy exposure compliance of portable radio products even under markedly non-uniform application of particular RF energy exposure requirements across countries and regions, a method, a mobile station, and a user-based communication system, comprising a mobile station and an audio accessory, are provided that determine that a/the mobile station intends to transmit over an uplink, determine whether the mobile station is being operated in a body-worn position, determine an uplink transmit power scale factor, and when the mobile station is being operated in a body-worn position, apply the uplink transmit power scale factor to an uplink transmit power to produce a scaled uplink transmit power. In one embodiment, the user-based communication system further determines whether the mobile station is being operated in a body-worn position based on a determination of whether the audio accessory is actively engaged. Further, in various embodiments, the scaling of uplink transmit power can be accomplished through the use of one or more of two techniques, namely a maximum uplink transmit power scaling, that is, a scaling of a maximum uplink transmit power during an uplink communication, or a time-averaged uplink transmit power scaling, that is, a reduction of a percentile duty-cycle (talk-time) allowance over a specified transmit-power time-averaging time-window.

Figure 1:
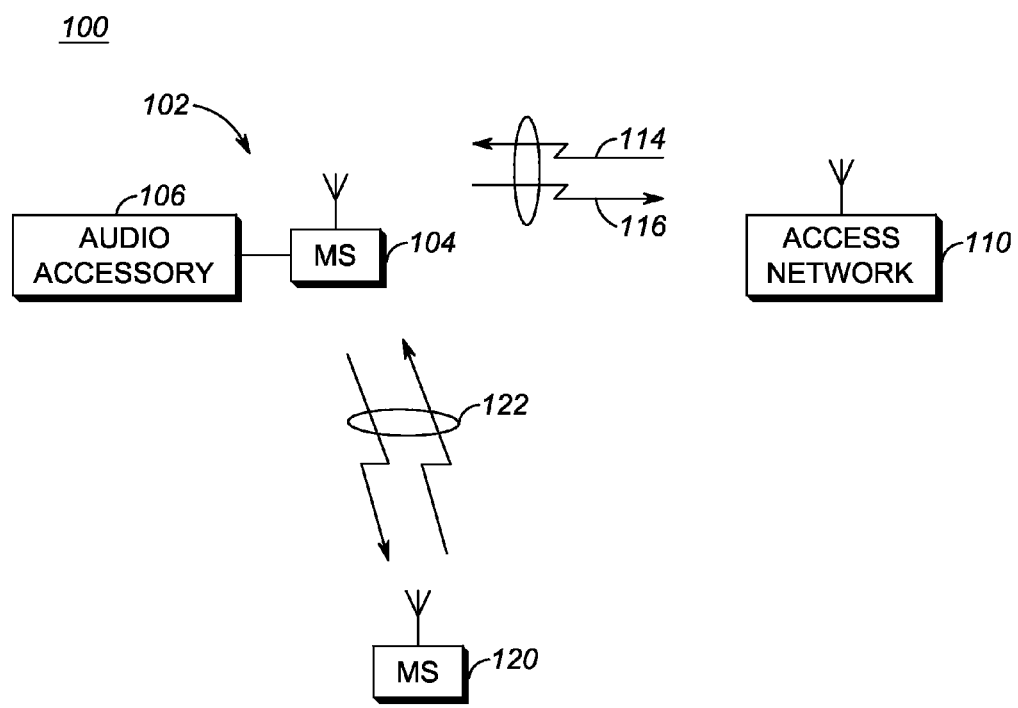
FIG. 1 is a block diagram of a wireless communication system in accordance with some embodiments of the present invention.

The present invention may be more fully described with reference to FIGS. 1-6. FIG. 1 is a block diagram of a wireless communication system 100 in accordance with some embodiments of the present invention. Communication system 100 includes a user-based communication system 102 that may engage in a wireless communication with an access network 110 of a wireless infrastructure, such as a public safety network, via a first air interface 112. Air interface 112 includes a downlink 114 and an uplink 116. In another embodiment of the present invention, instead of, or in addition to, engaging in a wireless communication with access network 110, user-based communication system 102 may engage in a peer-to-peer wireless communication with a portable communication device, that is, MS 120, via a second air interface 122.

User-based communication system 102 includes a mobile station (MS) 104, such as but not limited to a cellular telephone, a smart phone, a two-way radio such as a land mobile radio (LMR), and so on. User-based communication system 102 further includes an audio accessory 106, such as a remote speaker microphone (RSM), that is coupled to MS 104 via a wired connection or a short-range wireless connection. For example, MS 104 may be mechanically coupled, for example, via a hooking mechanism, to a belt of a user and audio accessory 106 may be mechanically coupled, for example, via a hooking mechanism, to a shoulder strap of the user. The user then may listen to, and input, audio communications into audio accessory 106 and audio accessory 106, in turn, transmits the user's audio communications to, and receives audio communications for the user from, access network 110 via MS 104.

Figure 2:
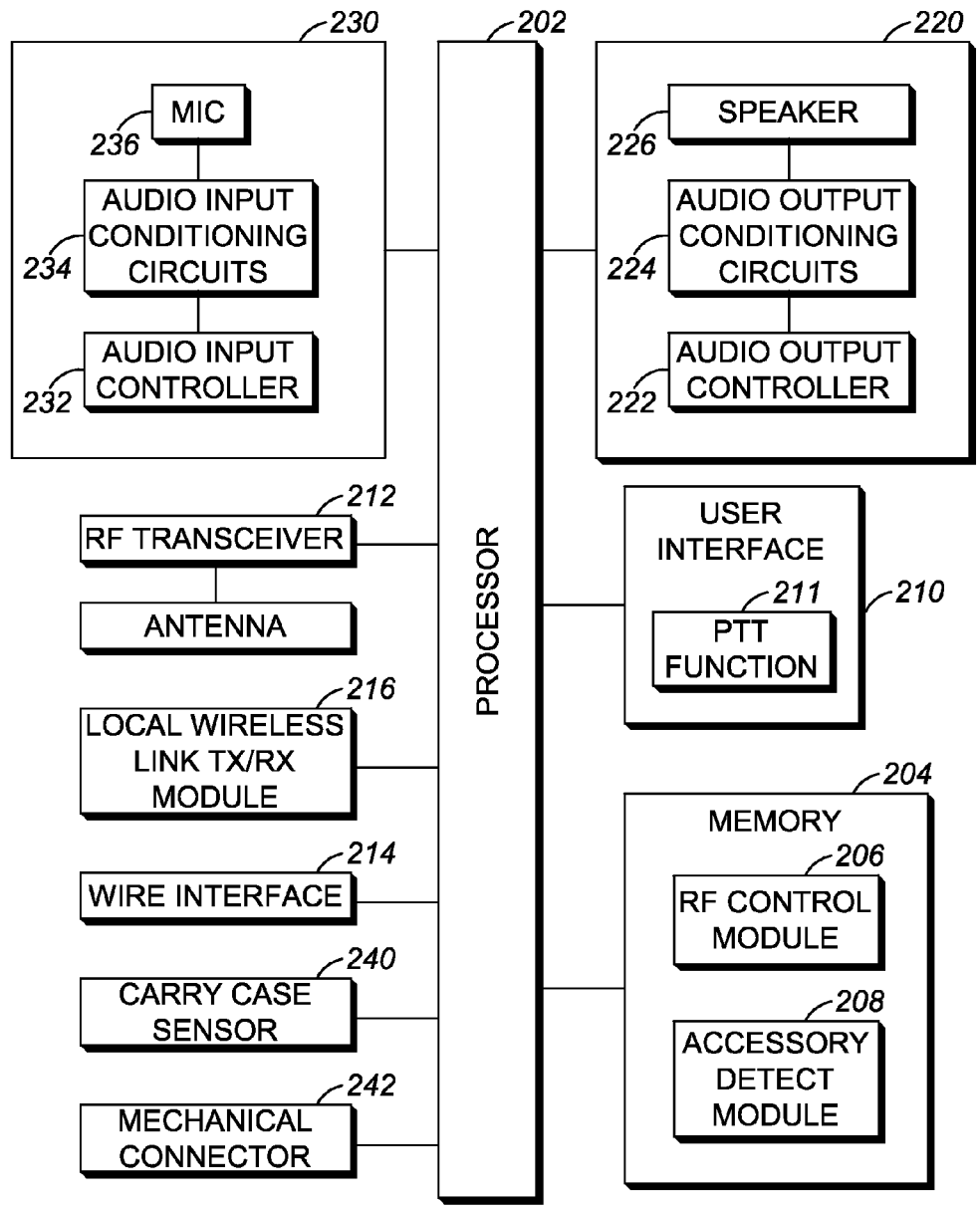
FIG. 2 is a block diagram of a mobile station of the communication system of FIG. 1 in accordance with some embodiments of the present invention.

Referring now to FIG. 2, a block diagram is provided of MS 104 in accordance with some embodiments of the present invention. MS 104 operates under the control of a processor 202, such as one or more microprocessors, microcontrollers, digital signal processors (DSPs), combinations thereof or such other devices known to those having ordinary skill in the art. Processor 202 controls the operation of MS 104, including an exchange of audio communications with audio accessory 106 and an exchange of radio frequency (RF) signals with access network 110 and/or MS 120. MS 104 further includes an RF transceiver 212 coupled to an antenna and capable of exchanging RF signals with access network 110 and/or MS 120. MS 104 also includes one or more of a wire interface 214 and a local wireless link transmit/receive module 216 that allow the MS to directly communicate with audio accessory 106, for example, via a wired link or a short-range wireless link such as a Bluetooth® link, a near field communication (NFC) link, or a Wireless Local Area Network (WLAN) link, or the like, respectively.

Processor 202 operates MS 104 according to data and instructions stored in an at least one memory device 204, such as random access memory (RAM), dynamic random access memory (DRAM), and/or read only memory (ROM) or equivalents thereof, that stores data and programs that may be executed by processor 202 so that the MS may perform the functions described herein. For example, at least one memory device 204 includes a radio frequency (RF) power control module 206 for controlling an RF uplink transmit power of the MS. At least one memory device 204 further maintains one or more scale factors for scaling uplink transmit power, that is, scale factors that are used scale down, or reduce, an uplink transmit power of MS and thereby enable compliance of the MS with respect to an applicable exposure limit in a body-worn position.

As described in greater detail below, in various embodiments of the present invention, the one or more scale factors may include a value that is used to perform maximum uplink transmit power scaling, that is, a scaling of a maximum uplink transmit power during an uplink communication, and/or may include a value that is used to perform a time-averaged uplink transmit power scaling, that is, a reduction of a percentile duty-cycle (talk-time) allowance over a specified transmit-power time-averaging time-window. That is, when processor 202 determines, according to criteria described below, that MS 104 is being worn in a body-worn position, the scale factor is applied to a an uplink transmit power parameter of the MS to scale down, or reduce, an immediate, or a time-averaged, uplink transmit power of the MS, thereby enabling compliance of the MS with respect to applicable exposure limits in a body-worn position and correspondingly limit an exposure of a user of the MS to RF energy.

The one or more scale factors may be pre-configured into the MS in the factory, or may be received, by MS 104, in an overhead message from access network 110 or from MS 120 and then stored, by MS 104, in at least one memory device 204. For instance, an MS may be pre-configured to operate in a certain network in a certain region (for example, a country) where certain RF exposure limitations exist in the form of SAR limits, the pre-configuration thus implementing a region-specific maximum uplink transmit power scale factor. Another instance is when an MS is configured to be able to operate under any RF exposure limitation in any of a group of regions, acquiring region-specific maximum uplink transmit power scale factor via an overhead message from access network 110 or, for example, being relayed such information by MS 120. Alternatively, the overhead message provides only information about the region in which the MS operates and the corresponding region-specific scale factor is retrieved from a look-up table that is pre-stored in memory 204.

MS 104 also includes a user interface 208 that provides a user of the MS with a capability of interacting with the MS, including inputting instructions into the MS. For example, user interface may include a Push-to-Talk (PTT) function 211, such as a PTT key or a voice-enabled PTT trigger (in the latter instance, a link between audio input circuitry 230 and PTT function 211 may be provided by processor 202) for initiating, and reserving a floor of, a PTT call. Unless otherwise specified herein, the functions described herein as being performed by MS 104 are performed by processor 202.

MS 102 further includes audio output circuitry 220 for audio output for listening by a user of the MS and audio input circuitry 230 for allowing a user to input audio signals into the MS. In an embodiment of the present invention, audio output circuitry 220 includes an audio output controller 222 coupled to audio output conditioning circuits 224 and a speaker 226 coupled to the audio output conditioning circuits. Audio output controller 222 receives decoded audio output signals from processor 202 and sends the received decoded audio signals to audio output conditioning circuits 224 that perform various conditioning functions. For example, the audio output conditioning circuits 224 may reduce noise or amplify the signal. Speaker 226 receives the conditioned audio signals and allows audio output for listening by a user. Audio input circuitry 230 includes a microphone 236 coupled to audio input conditioning circuits 234 and an audio input controller 232 coupled to the audio input conditioning circuits. Microphone 236 allows a user to input audio signals into the audio accessory. User speech is received by microphone 236 and is converted into an electrical audio signal. Audio input conditioning circuits 234 receive the audio signal and perform various conditioning functions on the audio signal, for example, noise reduction. Audio input controller 232 receives the conditioned audio signal and sends a representation of the audio signal to processor 202, which then processes the signal for transmission via a radio frequency (RF) transmitter of RF transceiver 212. RF transceiver 212 comprises an RF receiver (not shown) for receiving RF signals from access network 110 or MS 102 and an RF transmitter (not shown) for transmitting RF signals to access network 110 or MS 120.

MS 104 further may include a carry case sensor 240, such as a radio frequency identifier (RFID) reader or near field communication sensor that is capable of communicating with a smart carry case and determining whether the carry case, in conjunction with the MS and its currently utilized accessories (antennas and audio accessory), is SAR compliant, for example, a carry case accessory that identifies itself to the MS, or an infrared sensor that detects the carry case accessory when the MS is placed in contact with the carry case. In addition, MS 104 may include a mechanical connector 242 for coupling the MS to a user of the MS, for example, a belt clip locking mechanism for locking the MS onto a belt of the user or into an MS carrying case that is coupled to a belt of the user. Mechanical connector 242 may include a switch that is flipped when the MS is locked onto a belt of the user or is locked into a carry case, and which is flipped the other way when the MS is no longer mechanically coupled to the user, or respectively the carry case, thereby indicating to the MS whether the MS is being worn in a body-worn position with a mechanically compatible carry accessory. Alternatively, carry accessory information retrieved through the various electrical and mechanical interfaces described in the foregoing may include the uplink transmit power scale factor(s) that may be employed in conjunction with the carry case, or information, such as the carry case model number, or another unambiguous identifier, that can be used to retrieve the uplink transmit power scale factor(s) that may be used in conjunction with the carry case and the currently utilized accessories (antennas and audio accessory) from a look-up table which is pre-stored in memory 204.

Figure 3:
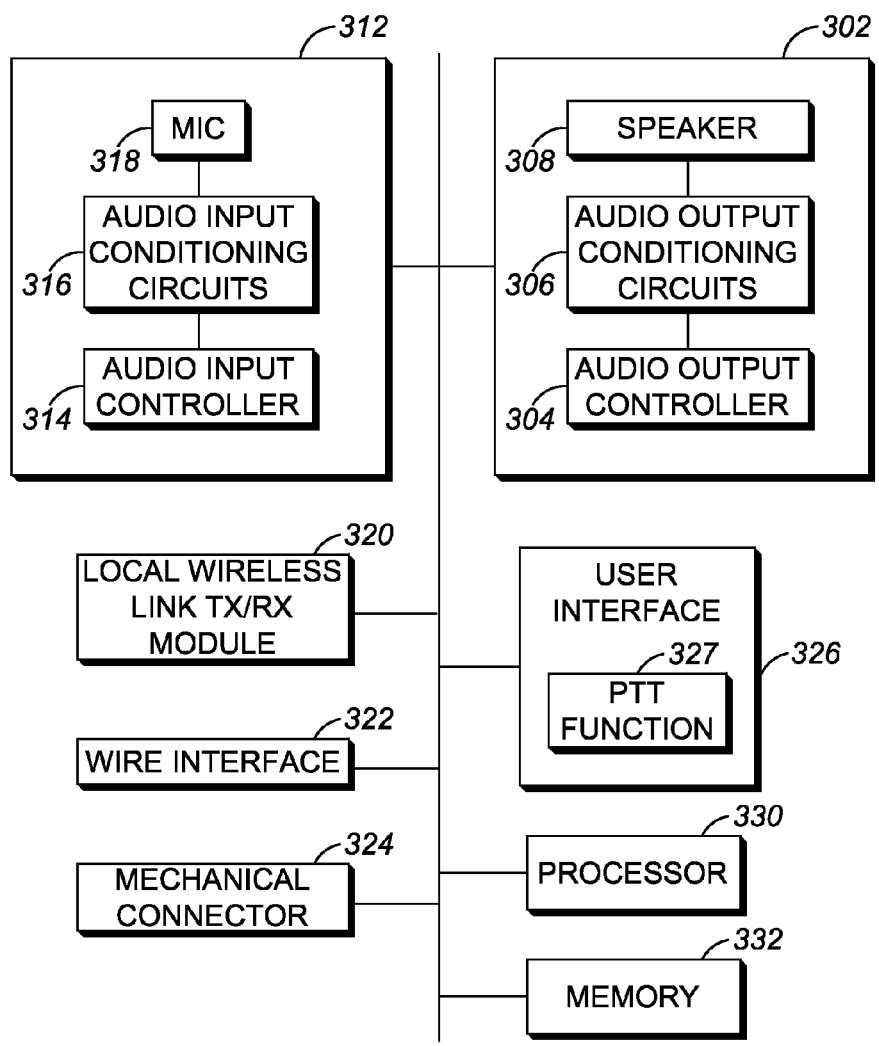
FIG. 3 is a block diagram of an audio accessory of the communication system of FIG. 1 in accordance with some embodiments of the present invention.

Referring now to FIG. 3, a block diagram is provided of audio accessory 106 in accordance with some embodiments of the present invention. Audio accessory 106 includes one or more of a wire interface 322 and a local wireless link transmit/receive module 320 that allow the MS to directly communicate with MS 104, for example, via a wired link, a Bluetooth® link, a NFC link, a WLAN link, or the like. Audio accessory 106 further includes a mechanical connector 324 for coupling the audio accessory to a user of the audio accessory, for example, for hooking the audio accessory onto the head of the user or onto a shoulder strap of the user.

Audio accessory 106 further includes audio output circuitry 302 for audio output for listening by a user of the audio accessory and audio input circuitry 312 for allowing a user to input audio signals into the audio accessory. In one embodiment of the present invention, audio output circuitry 302 may include an audio output controller 304 coupled to audio output conditioning circuits 306 and a speaker 308 coupled to the audio output conditioning circuits. Audio output controller 304 receives decoded audio output signals from MS 104 via one of wire interface 322 and local wireless link transmit/receive module 320 and sends the received decoded audio signals to audio output conditioning circuits 306 that perform various conditioning functions. For example, the audio output conditioning circuits 306 may reduce noise or amplify the signal. Speaker 308 receives the conditioned audio signals and allows audio output for listening by a user. Audio input circuitry 312 includes a microphone 318 coupled to audio input conditioning circuits 316 and an audio input controller 314 coupled to the audio input conditioning circuits. Microphone 318 allows a user to input audio signals into the audio accessory. User speech is received by microphone 318 and is converted into an electrical audio signal. Audio input conditioning circuits 316 receive the audio signal and perform various conditioning functions on the audio signal, for example, noise reduction. Audio input controller 314 receives the conditioned audio signal and sends a representation of the MS 104 via one of wire interface 322 and local wireless link transmit/receive module 320.

In various other embodiments of the present invention, audio output circuitry 302 may not include one or more of audio output controller 304 and audio output conditioning circuits 306, and audio input circuitry 312 may not include one or more of audio input conditioning circuits 316 and audio input controller 314, the functionality of which controllers and circuits may instead be performed by similar controllers and circuits included in MS 104 (that is, audio output controller 222, audio output conditioning circuits 224, audio input controller 232, and audio input conditioning circuits 234) before routing an audio signal to, or after receiving an audio signal from, audio accessory 106.

Audio accessory 106 also includes a user interface 326 that provides a user of the audio accessory with the capability of interacting with the audio accessory and the MS. For example, user interface 326 may include a PTT function 327, such as a PTT key or a voice-enabled PTT trigger (in the latter instance, a link between audio input circuitry 312 and PTT function 327 may be provided by processor 330) for initiating, and reserving a floor of, a PTT call, or any other button coupled to a switch that allows the user to enable one or more of audio input circuitry 312 and audio output circuitry 302. In another embodiment of the present invention, user interface 326 further may comprise software that provides a user of audio accessory 106 with a more complex capability of interacting with the audio accessory, including inputting instructions into the audio accessory.

Audio accessory 106, optionally, may include a processor 330, such as one or more microprocessors, microcontrollers, digital signal processors (DSPs), combinations thereof or such other devices known to those having ordinary skill in the art. Processor 330 may control the operation of audio accessory 106, including an exchange of audio communications with MS 104. Processor 330 then operates audio accessory 106 according to data and instructions stored in an at least one memory device 332, such as random access memory (RAM), dynamic random access memory (DRAM), and/or read only memory (ROM) or equivalents thereof, that stores data and programs that may be executed by processor 330 so that the audio accessory may perform the functions described herein.

In some embodiments of the present invention, the presence of an audio signal above a pre-defined intensity threshold level, input to processor 330 or processor 202 is interpreted by processor 330 or processor 202 as a PPT-enabling event that triggers uplink transmission is the same way the physical actuation of a PTT button would do.

MS 104 preferably is a Public Safety (PS) device that communicates with access network 110 via a Public Safety Narrowband (PSNB) spectrum. However, MS 104 may any type of wireless user device, such as a personal device (for example, a cellular telephone) that communicates with access network 110 via a wireless network technology such as Code Division Multiple Access 2000 (CDMA 2000), Universal Mobile Telecommunication System (UMTS), Frequency Division Multiple Access (FDMA), Time Division Multiple Access (TDMA), Long Term Evolution (LTE), Wireless Local Area Network (WLAN) as described by the IEEE 802.xx standards, for example, the 802.11, 802.15, 802.16, or 802.20 standards, or Orthogonal Frequency Division Multiple Access (OFDM).

Figure 4:
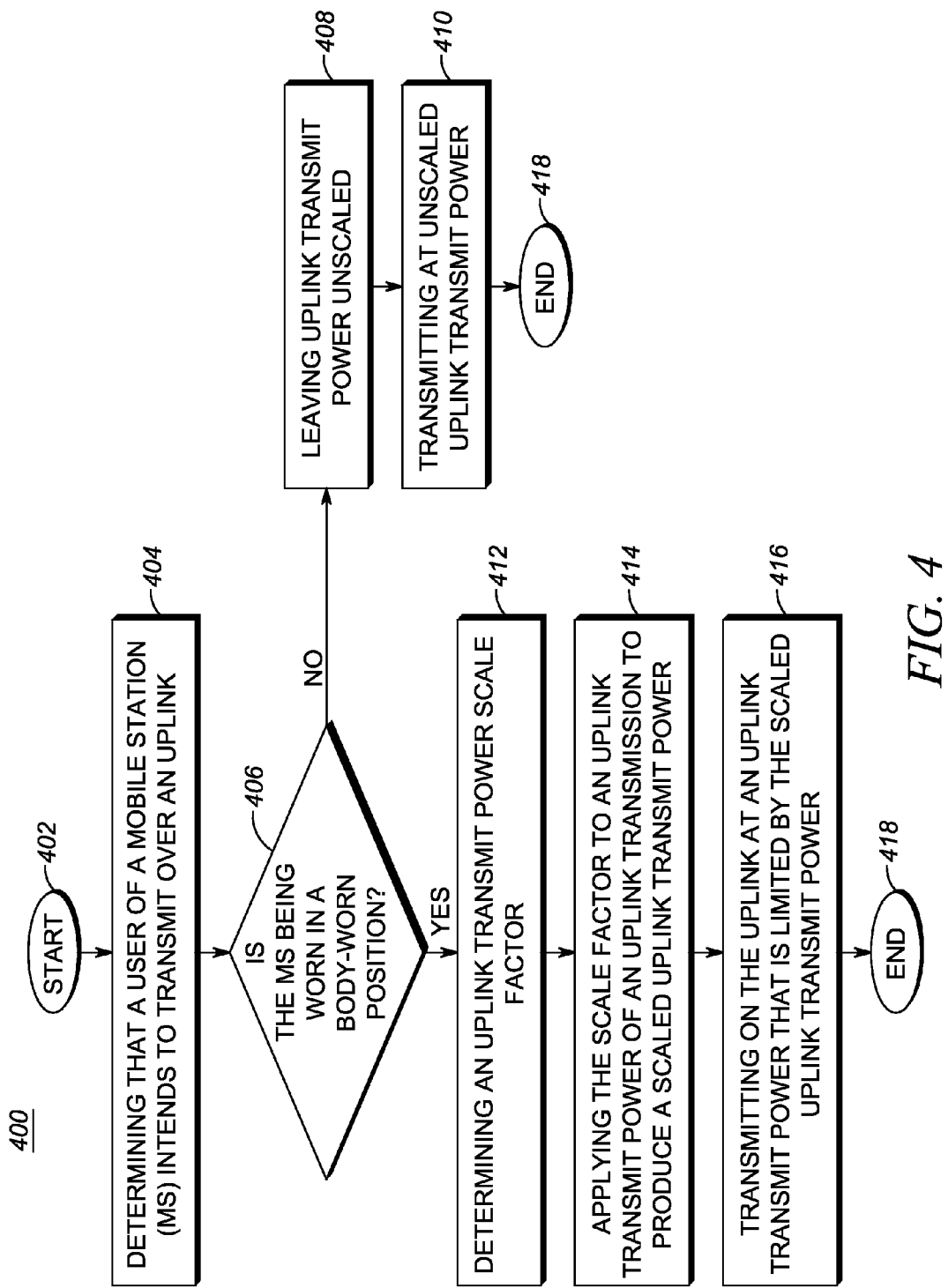
FIG. 4 is a logic flow diagram illustrating a method by which a user-based communication system of the wireless communication system of FIG. 1 controls an uplink transmit power in accordance with some embodiments of the present invention.

Referring now to FIG. 4, a logic flow diagram 400 is provided of a method of uplink power control that is performed by user-based communication system 102 in accordance with some embodiments of the present invention. Logic flow diagram 400 begins (402) when MS 104 determines (404) that a user of the MS intends to transmit over uplink 116. For example, the user may activate PTT function 211 of user interface 210, or the user may otherwise instruct the MS to set up a call. In response to determining that the user intends to transmit on the uplink, MS 104 determines (406) whether the MS is being operated in a body-worn position, that is, is being worn on the user's body.

Detection of whether audio accessory 106, such as an RSM, is actively engaged may indicate whether the MS is being worn on the body. For example, when MS 104 detects that audio accessory 106 is actively engaged, this may indicate that MS 104 is being worn on the body, for example, in a belt clip. However, a failure to detect that audio accessory 106 is actively engaged may indicate that the user is holding the MS in his or her hand, away from his/her body, when engaging in a communication session and that therefore the MS in not being operated in a body-worn position. MS 104 also may mechanically detect whether the MS is being worn on the body, for example, mechanical connector 242 may indicate, for example, by a position of a switch included in the mechanical connector to the carry accessory, whether the MS is being worn on the body.

For example, in one embodiment of the present invention, in detecting a presence or a use of audio accessory 106, at least one memory device 204 of MS 104 may include an accessory detection module 208, that is, software that, when executed by processor 202 of the MS, allows the MS to detect an attachment, wired or wireless and to the MS, of an active audio accessory such as audio accessory 106. In another embodiment of the present invention, MS 104 may detect a communication with audio accessory 106, via wire interface 214 or via wireless link transmit/receive module 216. For example, MS 104 may determine that the MS is being operated in a body-worn position when the MS detects a triggering of an RF transmission by audio accessory 106, for example, a user activating PTT function 327, for example, pushing a Push-to-Talk (PTT) key, on the audio accessory, in response to which the MS then sets up a channel with access network 110 or with another MS, such as MS 120. In yet another embodiment of the present invention, MS may detect a user interacting with the MS in a way that indicates that an audio accessory is not attached or is not being actively used. For example, a user of the MS may trigger an RF transmission via user interface 210 of the MS, for example, by activating PTT function 211 of the MS, as opposed to PTT function 327 of audio accessory 106. In still other embodiments of the present invention, MS 104 may determine whether the MS is being operated in a body-worn position by reference to carry case sensor 240 or by reference to mechanical connector 242.

In response to determining that MS 104 is not being operated in a body-worn position, then the MS, and in particular processor 202, may determine (408) not to scale down an uplink transmit power and may transmit (410) at an unscaled uplink transmit power. Logic flow diagram 400 then ends (418).

In response to determining that MS 104 is being operated in a body-worn position, MS 104, and in particular processor 202, determines (412), by reference to at least one memory device 204, one or more scale factors for scaling uplink transmit power. that is, a scale factor that is used scale down, or reduce, an uplink transmit power of MS and thereby enable compliance of the MS with respect to the applicable exposure limit in a body-worn position. In one embodiment of the present invention, the one or more scale factors may comprise a value that is used to perform maximum uplink transmit power scaling, that is, a scaling of a maximum uplink transmit power during an uplink communication. In other embodiments of the present invention, the one or more scale factors may instead, or in addition, comprise a value that is used to perform a time-averaged uplink transmit power scaling, that is, a reduction of a percentile duty-cycle (talk-time) allowance over a specified transmit-power time-averaging time-window.

That is, in one such embodiment wherein the scale factor is used to perform maximum uplink transmit power scaling, the scale factor may be a predetermined percentage of the maximum uplink transmit power permitted when the MS is operated in a body-worn position. For example, the 1-gram (g) Specific Absorption Rate (SAR) limit promulgated by the Federal Communications Commission (FCC) is 8.0 watt/kg for occupational users. Suppose that the MS 104 SAR is 10 watt/kg at a certain distance from the flat phantom and when transmitting at 'Maximum Power.' In such an instance and in response to determining that MS 104 is not being operated in a body-worn position, the scale factor may be, for example, a value '0.79,' that is, MS may limit its maximum uplink transmit power to the scaled maximum uplink transmit power of 'Maximum Power*0.79.' In this way the SAR would be limited to 7.9 watt/kg. If a larger margin of compliance is desired, then the factor can be chosen smaller than 0.79.

In another such embodiment, wherein the scale factor is used to perform time-averaged uplink transmit power scaling, the scale factor may be a duty cycle factor. That is, MS 104 may monitor a duty cycle talk time and alert a user of the MS when the duty cycle is such that the MS is approaching an average maximum permissible uplink transmit power level limit for a given time window. For example, for discontinuous transmissions such as PTT, the SAR limit promulgated by the FCC averages the SAR over a 6 minute time period, or window, in determining a maximum permissible SAR. In response to determining that MS 104 is not being operated in a body-worn position, the MS may monitor the average uplink transmit power employed by the MS over such a time window and when said SAR limit is being approached, play out an alert to the user, for example, an audio alert via audio output circuitry 220 or a visual alert via user interface 210, or alternatively it can suspend radio transmissions for the remainder of the time period (and notify both the user and a party at the other end of the call that communications are being temporarily suspended).

For example, again, the 1-g SAR limit promulgated by the FCC is 8.0 watt/kg for occupational users. Suppose that the MS 104 SAR (including the 50% duty cycle allowance described in the foregoing) is 11 watt/kg at a certain distance from the flat phantom and when transmitting at 'Maximum Power.' In such an instance and in response to determining that MS 104 is being operated in a body-worn position, the MS may impose a maximum duty cycle ('MAX_DUTY CYCLE') within any 6 minute time window upon uplink transmissions by the MS, for example, 'MAX_DUTY CYCLE=0.50*8/11*0.99=0.36 (36%),' wherein the maximum effective uplink transmit power scale factor is the value '8/11,' or '0.72.' In this way, the SAR is limited to 99% of the limit. If a larger margin of compliance is desired, then the last multiplying factor can be chosen smaller than 0.99, yielding a percentile talk-time limit lower than 36%. It should be noted that in this embodiment, wherein the scale factor is used to perform time-averaged uplink transmit power scaling, the power scale factor is employed to reduce the time-averaged uplink power over the time-averaging window rather than reducing the maximum power setting during all uplink communications. In other words, the maximum duty cycle allowance is reduced from 50% to 36% rather than reducing the transmit power during each uplink communication. This can be advantageous since it is quite uncommon that any MS user ever approaches 50% talk-time, so the 36% talk-time limitation may seldom if ever be experienced by any user, and the radio communication range is not impacted by any maximum uplink transmit power reduction since the transmit power during uplink communications is not scaled down.

It is readily understood that both uplink power scaling approaches described above can be applied concurrently, each contributing to the reduction of the time-averaged uplink power, and that the relative contribution share can be either set or dynamically adjusted during MS operation. For instance, the MS processor 202 may carry an ongoing tally of the time-averaged uplink power over a shifting time window comprising the last 6 minutes of use of the MS and determine how to share said contributions in real time as the MS use is in progression, in order to achieve optimum performance according to some predefined criteria, for instance MS battery life.

In response to determining that MS 104 is being operated in a body-worn position and determining the one or more uplink transmit power scale factors, MS 104 then applies (414) the one or more scale factors to an uplink transmit power to produce a scaled uplink transmit power. For example, in one such embodiment and as described above, the scale factor may be a value that is applied to a maximum uplink transmit power during an uplink communication to produce a scaled, or reduced, maximum uplink transmit power (as opposed to a maximum uplink transmit power of the MS when the MS is not worn in a body-worn position). By way of another example, in another such embodiment and as described above, the scale factor may be a value that is used to perform a time-averaged uplink transmit power scaling, that is, a reduced talk-time allowance, to produce a scaled time-averaged uplink transmit power wherein the scaled maximum effective uplink transmit power is a reduced time-averaged uplink transmit power at which the MS can transmit (again, as opposed to a time-averaged uplink transmit power at which the MS can transmit when the MS is not worn in a body-worn position). Further, MS 104 then may transmit (416), at most, at the scaled uplink transmit power, that is, at uplink transmission power levels that are limited, on the upside, to the scaled uplink transmit power, and logic flow diagram 400 then ends (418).

Figure 5:
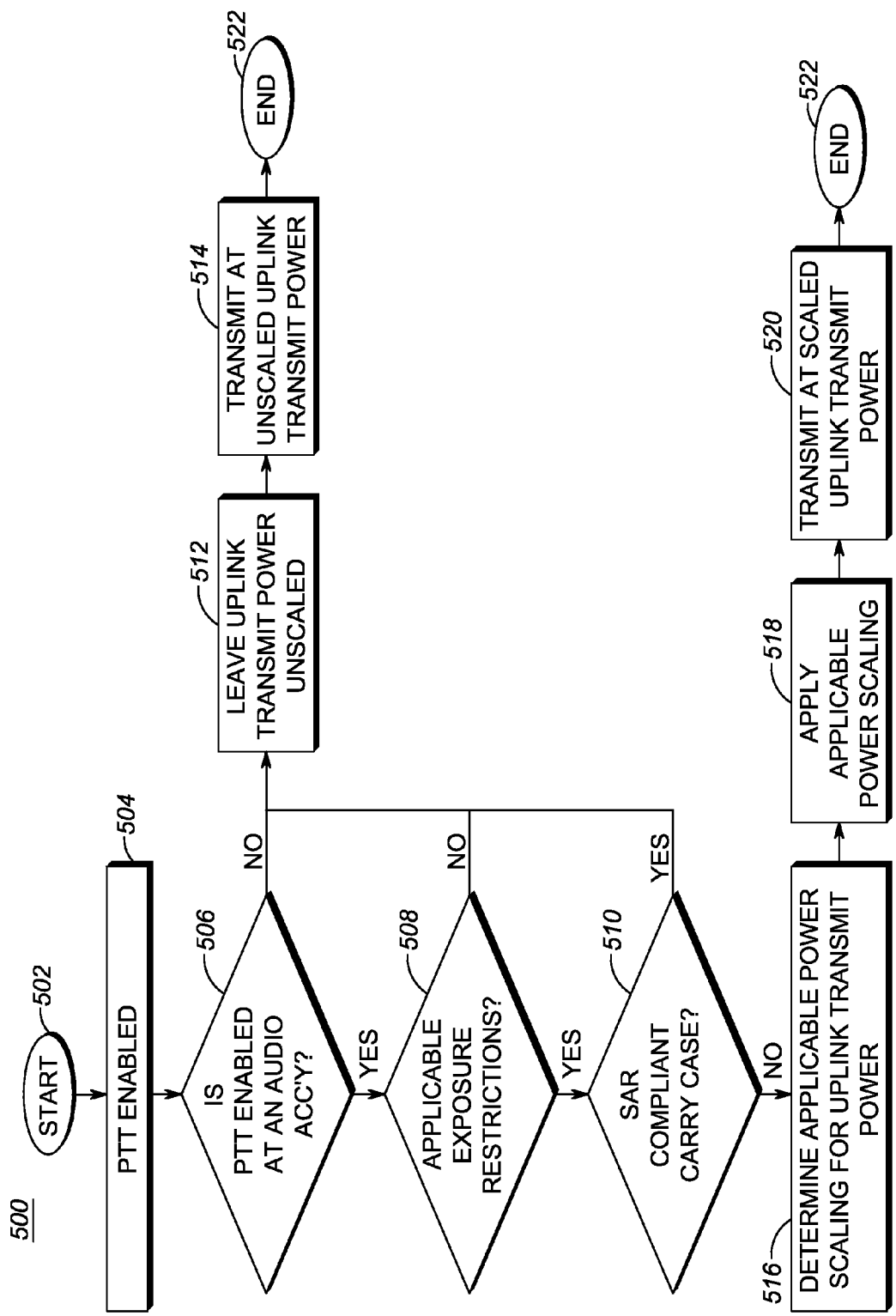
FIG. 5 is an exemplary logic flow diagram illustrating a method by which a user-based communication system of the wireless communication system of FIG. 1 controls an uplink transmit power in accordance with some embodiments of the present invention.

Referring now to FIG. 5, an exemplary logic flow diagram 500 is provided of a method of uplink power control that is performed by user-based communication system 102 in accordance with some embodiments of the present invention. Logic flow diagram 500 begins (502) when MS 104 determines (504) that a user of the MS intends to transmit, for example, over uplink 116 or air interface 122. For example, MS 104 may detect the user activating a PTT function 211, 327, such as depressing a PTT button, or otherwise inputting an instruction to set up a call. In response to determining that the user intends to transmit on the uplink, MS 104 determines (506) whether the MS is being operated in a body-worn position. For example, if the activated PTT function is PTT function 211 of MS 104, then the MS may conclude that the user is holding the MS in his or her hand, away from his/her body, when engaging in a communication session and that therefore the MS in not being operated in a body-worn position. However, if the activated PTT function is PTT function 327 of audio accessory 106, then MS 104 may determine that the audio accessory is being actively engaged and that MS 104 is being operated in a body-worn position.

In response to determining that the MS is not being operated in a body-worn position, the MS may determine (512) not to scale down the uplink transmit power and may transmit (514) at an unscaled uplink transmit power. Logic flow diagram 500 then ends (522).

If, at step 506, MS 104 determines that the MS is being operated in a body-worn position, the MS then may determine (508) whether there are particular applicable SAR restrictions on user exposure to MS RF radiation. For example, in determining whether there are particular SAR restrictions on user exposure to MS RF radiation, MS 104 may determine the MS's geographical location or area in accordance with any of many well-known location determination techniques and determine whether there are any particular SAR restrictions at the determined geographical location/area. The geographical locations with particular SAR restrictions may be preprogrammed into the at least one memory device 204 of the MS, or a public safety network where an MS is geographically located may convey such information to the MS via an overhead message. If there are no particular SAR restrictions on user exposure to MS RF radiation, then the MS may, again, determine (512) not to scale down the uplink transmit power and may transmit (514) at the unscaled uplink transmit power. Logic flow diagram 500 then ends (522).

If, at steps 508 and 510, MS 104 determines that there are particular SAR restrictions on user exposure to MS RF energy, MS 104 further may determine (510) whether the MS is in an SAR-compliant carry case, that is, a carry case that was determined to produce compliant SAR. If the MS is in an SAR-compliant carry case, then the MS may, again, determine (512) not to scale down the uplink transmit power and may transmit (514) at the unscaled uplink transmit power. Logic flow diagram 500 then ends (522).

However, if at steps 508 and 510, MS 104 determines that there are particular SAR restrictions on user exposure to MS RF energy, and the MS is not in an SAR-compliant carry case (for example, the MS may not be in any carry case), then the MS may determine (516), by reference to at least one memory device 204, one or more scale factors for scaling uplink transmit power, that is, scale factors that are used scale down, or reduce, an uplink transmit power of MS and thereby enable compliance of the MS with respect to the applicable exposure limit in a body-worn position. As described in greater detail above, the one or more scale factors may comprise a value that is used to perform maximum uplink transmit power scaling, that is, a scaling of a maximum uplink transmit power during an uplink communication, and/or a value that is used to perform a time-averaged uplink transmit power scaling, that is, a reduction of a percentile duty-cycle (talk-time) allowance over a specified transmit-power time-averaging time-window.

In response to determining that there are particular applicable SAR restrictions on user exposure to MS RF energy and that the MS is not in an SAR-compliant carry case, and further in response to determining the one or more scale factors, MS 104 then applies (518) the one or more scale factors to an uplink transmit power to produce a scaled uplink transmit power, wherein the scaled uplink transmit power is a reduced uplink transmit power at which the MS can transmit (as opposed to an uplink transmit power of the MS when the MS is not worn in a body-worn position). Further, MS 104 then may transmit (520), at most, at the scaled uplink transmit level, and logic flow diagram 500 then ends (522).

Figure 6:
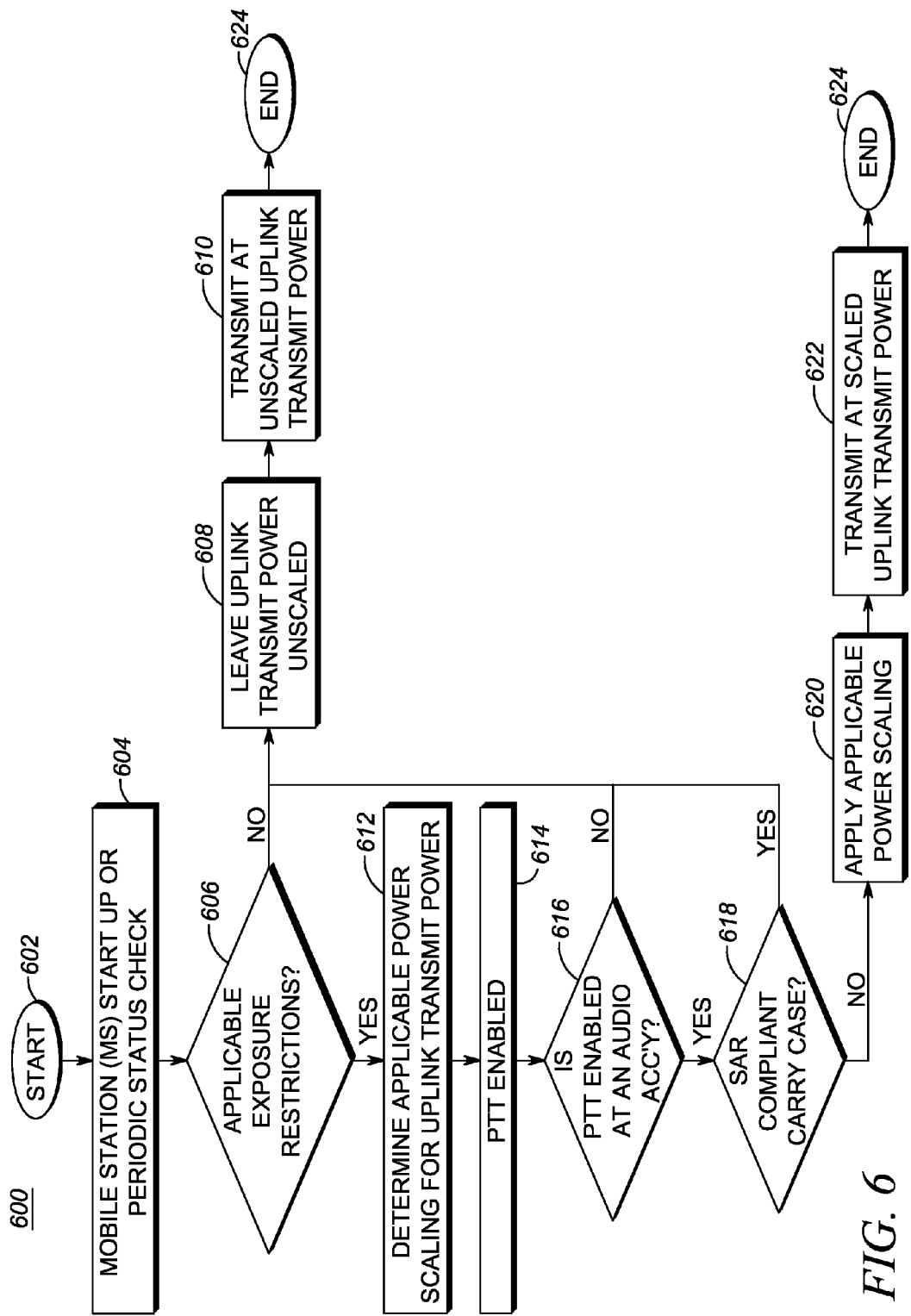
FIG. 6 is an exemplary logic flow diagram illustrating a method by which a user-based communication system of the wireless communication system of FIG. 1 controls an uplink transmit power in accordance with some embodiments of the present invention.

Referring now to FIG. 6, an exemplary logic flow diagram 600 is provided of a method of uplink power control that is performed by user-based communication system 102 in accordance with some other embodiments of the present invention. Logic flow diagram 600 begins (602) when MS 104 powers up (604) or intermittently, for example, periodically or non-periodically, determines to perform a status check. In response to powering up or determining to perform a status check, MS 104 determines (606) whether there are particular applicable SAR restrictions on user exposure to MS RF radiation. For example, in determining whether there are particular applicable SAR restrictions on user exposure to MS RF radiation, MS 104 may determine the MS's geographical location or area in accordance with any of many well-known location determination techniques and determine whether there are any particular SAR restrictions at the determined geographical location/area, as described above.

If there are no particular applicable SAR restrictions on user exposure to MS RF radiation, then the MS may determine (608) not to scale down an uplink transmit power and may transmit (610) at an unscaled uplink transmit power. Logic flow diagram 600 then ends (624).

If, at step 606, MS 104 determines that there are particular applicable SAR restrictions on user exposure to MS RF energy, MS 104 further may determine (612), by reference to at least one memory device 204, one or more scale factors for scaling uplink transmit power. that is, one or more scale factors that are used scale down, or reduce, an uplink transmit power of MS and thereby enable compliance of the MS with respect to the applicable exposure limit in a body-worn position. As described in greater detail above, the one or more scale factors may comprise a value that is used to perform maximum uplink transmit power scaling, that is, a scaling of a maximum uplink transmit power during an uplink communication, and/or a value that is used to perform a time-averaged uplink transmit power scaling, that is, a reduction of a percentile duty-cycle (talk-time) allowance over a specified transmit-power time-averaging time-window.

Subsequent to powering up or performing the status check, MS 104 determines (614) that a user of the MS intends to transmit, for example, over uplink 116 or air interface 122. For example, MS 104 may detect the user activating a PTT function 211, 327 or otherwise inputting an instruction to set up a call. In response to determining that the user intends to transmit on the uplink, MS 104 determines (616) whether the MS is being operated in a body-worn position. For example, if the activated PTT function is the PTT function 211 of MS 104 (as opposed to PTT function 327 of audio accessory 106), then the MS processor 202 may conclude that the user is holding the MS in his or her hand, away from his/her body, when engaging in a communication session and that therefore the MS in not being operated in a body-worn position. Accordingly, the MS may determine (608) not to scale down the uplink transmit power and may transmit (610) at an unscaled uplink transmit power. Logic flow diagram 600 then ends (624).

If, at step 616, MS 104 determines that the activated PTT function is that of audio accessory 106, indicating that the MS is being operated in a body-worn position, MS 104 may further determine (618) whether the MS is in an SAR-compliant carry case. If the MS is in an SAR-compliant carry case, then the MS may, again, determine (608) not to scale down the uplink transmit power and may transmit (610) at the unscaled uplink transmit power. Logic flow diagram 600 then ends (624).

However, if at step 618, MS 104 determines that the MS is not in an SAR-compliant carry case (for example, the MS may not be in any carry case), then the MS may determine to apply (620) the one or more scale factors to the uplink transmit power to produce a scaled uplink transmit power, wherein the scaled uplink transmit power level is a reduced uplink transmit power at which the MS can transmit (as opposed to an uplink transmit power of the MS when the MS is not worn in a body-worn position). Further, MS 104 then may transmit (622), at most, at the scaled uplink transmit power, and logic flow diagram 600 then ends (624).

Thus, by scaling down an uplink transmit power when MS 104 is being operated in a body-worn position, that is, is being worn on the user's body, user-based communication system 102, and in particular MS 104, enables compliance of the MS with respect to any particular applicable RF energy exposure limit, such as particular SAR restrictions, when worn in a body-worn position and reduces an exposure of a user of the MS to RF radiation. In various embodiments of the present invention, in determining whether to scale down an uplink transmit power, user-based communication system 102 further may consider, among other things, any particular applicable exposure restrictions, such as particular SAR restrictions, and whether the MS is in an SAR-compliant carry case.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for uplink power control comprising:
   determining that a mobile station intends to transmit over an uplink;
   determining whether an audio accessory is actively engaged;
   based on a determination that the audio accessory is actively engaged, determining whether the mobile station is being operated in a body-worn position;
   determining an uplink transmit power scale factor; and
   when the mobile station is being operated in a body-worn position, applying the uplink transmit power scale factor to an uplink transmit power to produce a scaled uplink transmit power.

2. The method of claim 1, wherein applying the uplink transmit power scale factor comprises scaling a maximum uplink transmit power during an uplink communication to produce a scaled maximum uplink transmit power.

3. The method of claim 2, further comprising limiting an uplink transmission power during the uplink communication to the scaled maximum uplink transmit power.

4. The method of claim 1, wherein applying the uplink transmit power scale factor comprises performing a time-averaged uplink transmit power sealing.

5. The method of claim 4, wherein performing the time-averaged uplink transmit power scaling comprises reducing a percentile duty-cycle allowance over a specified transmit-power time-averaging time-window.

6. The method of claim 1, wherein determining whether the audio accessory is actively engaged comprises determining whether Push-to-Talk is enabled at the audio accessory.

7. The method of claim 1, wherein applying the maximum uplink transmit power scale factor to an uplink transmission comprises:
   determining whether the mobile, station is subject to particular radio frequency exposure restrictions; and
   when the mobile station is being operated in a body-worn position and is subject to particular radio frequency exposure restrictions, applying the uplink transmit power scale factor to an uplink transmission.

8. The method of claim 1, wherein applying the uplink transmit power scale factor to an uplink transmission comprises:
   determining whether the mobile station is placed in a Specific Absorption Rate-compliant carry case; and
   when the mobile station is being operated in a body-worn position and is not placed in to Specific Absorption Rate-compliant carry case, applying the uplink transmit power scale factor to an uplink transmission.

9. The method of claim 1, further comprising, when the mobile station is not being operated in a body-worn position, leaving the uplink transmit power unsealed.

10. A user-based communication system comprising:
    an audio accessory; and
    a mobile station coupled to the audio accessory, wherein the mobile station is configured to:
       determine that a mobile station intends to transmit over an uplink;
       determine whether the audio accessory is actively engaged;
       based on the determination of whether the audio accessory is actively engaged, determine whether the mobile station is being operated in a body-worn position;
       determine an uplink transmit power scale factor; and
       when the mobile station is being operated in a body-worn position, apply the uplink transmit power scale factor to an uplink transmit power to produce a scaled uplink transmit power.

11. The system of claim 10, wherein the audio accessory and the mobile station each comprises a Push-to-Talk (PTT) function and wherein the mobile station is configured to determine whether the audio accessory is actively engaged based on whether a user has activated the FIT function of the audio accessory or the PTT function of the mobile station.

12. The method of claim 1, wherein the uplink transmit power scale factor is a predetermined percentage of a maximum uplink transmit power permitted when the mobile station is being operated in a body-worn position.

13. The system of claim 10, wherein the uplink transmit power scale factor is a predetermined percentage of a maximum uplink transmit power permitted when the mobile station is being operated in a body-worn position.

14. A portable communication system, comprising:
is body-worn mobile station having a push-to-talk (PIT);
a body-worn audio accessory having a PIT, the body-worn mobile station being operatively coupled to the body worn audio accessory; and
the body worn mobile station for applying an uplink transmit power scale factor to an uplink transmit power to produce a sealed uplink transmit power in response to a PIT press of the body audio accessory or a PIT press of the body worn mobile station.

15. The portable communication system of claim 14, wherein the uplink transmit power scale factor is to predetermined percentage of a maximum uplink transmit power permitted when the mobile station is being operated in a body-worn position.

* * * * *